(12) United States Patent
Caponera et al.

(10) Patent No.: US 8,911,189 B2
(45) Date of Patent: Dec. 16, 2014

(54) FRANGIBLE FASTENER

(71) Applicant: Apical Industries, Inc., Oceanside, CA (US)

(72) Inventors: Nicholas Philip Caponera, Valatie, NY (US); Sven Emil Andersson, Oceanside, CA (US)

(73) Assignee: Apical Industries, Inc., Oceanside, CA (US)

( * ) Notice: Subject to any disclaimer, the term of this patent is extended or adjusted under 35 U.S.C. 154(b) by 0 days.

(21) Appl. No.: 13/777,853

(22) Filed: Feb. 26, 2013

(65) Prior Publication Data

US 2014/0241826 A1 Aug. 28, 2014

(51) Int. Cl.
*F16B 31/00* (2006.01)
*F16B 35/00* (2006.01)

(52) U.S. Cl.
CPC ...................... *F16B 35/00* (2013.01)
USPC .................................... 411/2; 411/1

(58) Field of Classification Search
USPC .......... 411/1–4, 383, 395, 396, 403, 411, 424
See application file for complete search history.

(56) References Cited

U.S. PATENT DOCUMENTS

| | | | |
|---|---|---|---|
| 2,083,054 A * | 6/1937 | Cline ................................ 285/2 |
| 3,224,316 A | 12/1965 | Grikscheti et al. |
| 3,498,174 A | 3/1970 | Schuster et al. |
| 3,512,447 A * | 5/1970 | Vaughn ............................ 411/5 |
| 3,865,007 A | 2/1975 | Stanback |
| 3,965,792 A * | 6/1976 | King, Jr. ........................ 411/361 |
| 5,110,158 A * | 5/1992 | Sabo et al. ....................... 285/92 |
| 5,499,892 A * | 3/1996 | Reed .................................. 411/5 |
| 5,713,705 A | 2/1998 | Grunbichler |
| 6,095,733 A * | 8/2000 | Busby et al. .................... 411/10 |
| 6,109,848 A | 8/2000 | Werner |
| 6,176,659 B1 | 1/2001 | Hardt et al. |
| 6,699,062 B1 | 3/2004 | Barnett et al. |
| 7,275,903 B2 * | 10/2007 | Schultz ......................... 411/378 |
| 2003/0198528 A1 * | 10/2003 | Onishi et al. ..................... 411/2 |
| 2009/0194638 A1 * | 8/2009 | Dennis .......................... 244/131 |
| 2009/0196708 A1 | 8/2009 | Stauch et al. |

* cited by examiner

*Primary Examiner* — Roberta Delisle
(74) *Attorney, Agent, or Firm* — Peter K. Hahn; Pillsbury Winthrop Shaw Pittman LLP

(57) ABSTRACT

This disclosure relates to a frangible fastener configured such that a first end of the fastener separates from a second end of the fastener responsive to a breaking force. The fastener may comprise a head portion, a frangible portion, a tool engagement portion, a threaded portion, and/or other portions. The frangible portion may include a frangible body. The frangible body may form a plurality of through wall cuts. The frangible portion may be configured such that the breaking force is proportional to a quantity of through wall cuts, a cross sectional area of through wall cuts, and/or a shape of through wall cuts. The frangible portion may be configured such that the breaking force is proportional to a wall thickness of the frangible body. The location of the tool engagement portion may minimize and/or eliminate torsional loading of the frangible portion during tightening with a tightening tool.

20 Claims, 7 Drawing Sheets

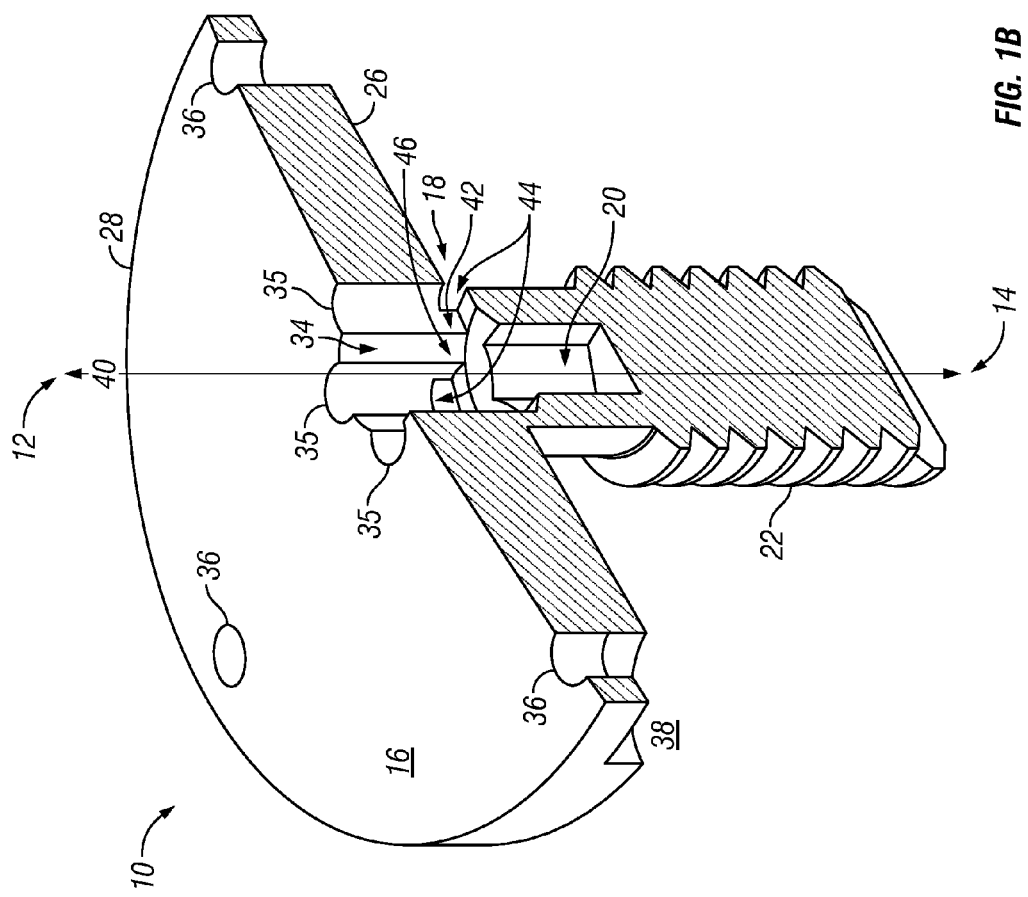

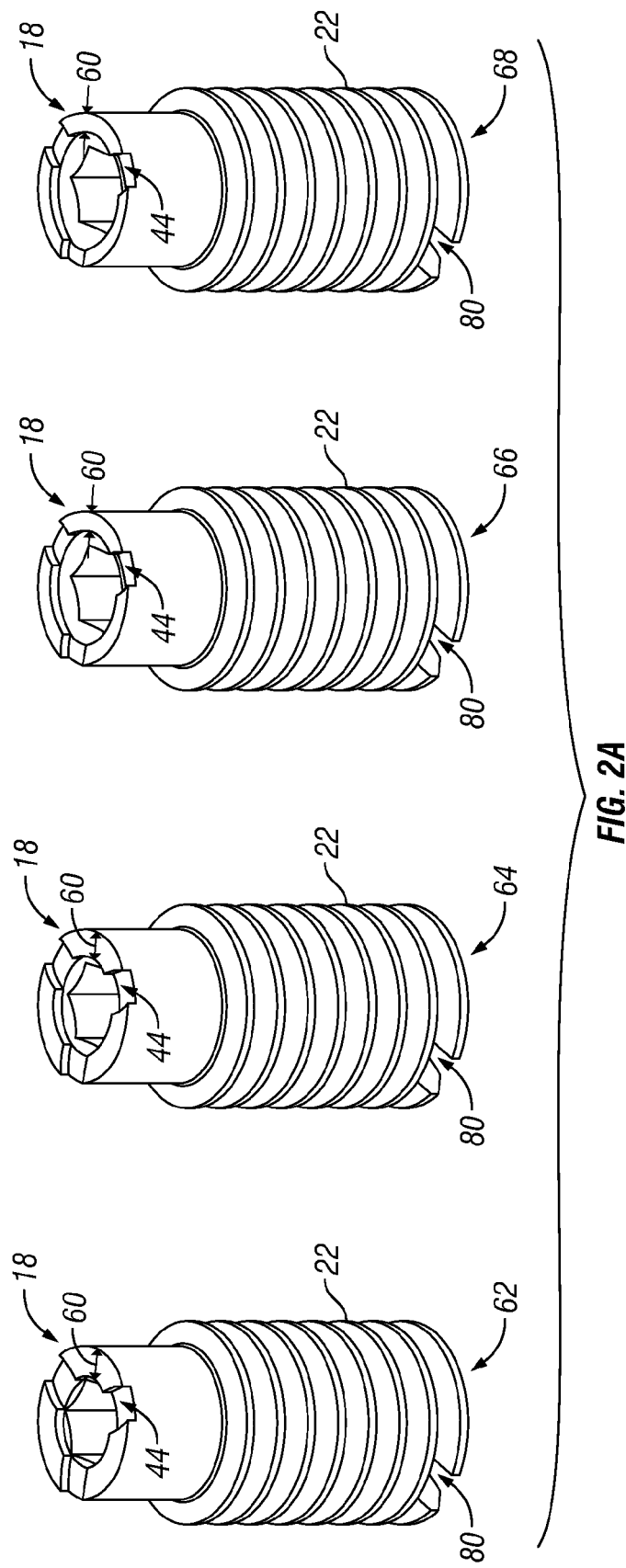

Method
300

302
Form a head portion at a first end of the fastener

304
Form a frangible portion adjacent to the head portion toward a second end along a first axis.

306
Form a plurality of through wall cuts in a wall thickness of a frangible body.

308
Form a tool engagement portion such that the tool engagement portion is configured to engage a tightening tool.

310
Form a threaded portion adjacent to the tool engagement portion at the second end of the fastener along the first axis.

FIG. 3

FRANGIBLE FASTENER

FIELD OF THE DISCLOSURE

This disclosure relates to a frangible fastener configured such that a first end of the fastener separates from a second end of the fastener responsive to a breaking force.

BACKGROUND

Frangible fasteners are known. Frangible fasteners break when subjected to forces above threshold levels. Frangible fasteners are commonly used to couple two or more structural components that are configured to separate when subjected to forces above the threshold levels. For example, an emergency compartment door may be closed and secured by frangible fasteners. These frangible fasteners are designed to break when the pressure exerted against the door reaches a certain level. Once the fasteners break the compartment door can open. Often, frangible fasteners are composed of multiple pieces joined together to make one device. Also, typical frangible fasteners may be limited by an amount of torque that may be applied to the fastener during installation so that the fastener does not break during installation

SUMMARY

One aspect of the disclosure relates to a frangible fastener. The frangible fastener may be configured such that the first end separates from the second end responsive to a breaking force. In some implementations, the fastener may comprise a head portion, a frangible portion, a tool engagement portion, a threaded portion, and/or other portions.

The head portion may be located at the first end of the fastener. The head portion may include a channel configured to receive a tightening tool. The head portion may include a plurality of peripheral holes configured to receive safety wiring.

The frangible portion may be located adjacent to the head portion toward the second end along a first axis. The frangible portion may comprise a frangible body having a plurality of through wall cuts in a wall thickness of the frangible body. The frangible body may be configured to separate at or near the through wall cuts responsive to the breaking force. In some implementations, the frangible body may have a generally tubular form. The through wall cuts may comprise radial through wall cuts in the wall thickness of the tube on a plane substantially perpendicular to the first axis. In some implementations, the frangible portion may be configured to conduct the tightening tool from the channel in the head portion to the tool engagement portion through a conduit formed by the tubular frangible body.

In some implementations, the frangible portion may be configured such that the breaking force is between about 5 pounds and about 400 pounds. In some implementations, the frangible portion may be configured to separate responsive to one or more of a tensile force, a shear force, and/or other forces. In some implementations, the frangible portion may be configured such that the breaking force is proportional to the magnitude of the through wall cuts. The magnitude of the through wall cuts may comprise a quantity of the through wall cuts, a cross sectional area of the through wall cuts, a shape of the through wall cuts, and/or other properties of the through wall cuts. In some implementations, the frangible body may form three through wall cuts in the wall thickness of the frangible body. In some implementations, the frangible body may form five through wall cuts in the wall thickness of the frangible body.

In some implementations, the frangible portion may be configured such that the breaking force is proportional to the wall thickness of the frangible body. In some implementations, the frangible portion may be configured such that the breaking force is proportional to inherent material properties of the frangible portion. The inherent material properties may include one or more of tensile strength, shear strength, and/or other material properties of the material used to form the frangible fastener.

The tool engagement portion may be configured to engage the tightening tool. The tool engagement portion may be located adjacent to the frangible portion toward the second end along the first axis.

The threaded portion may be located adjacent to the tool engagement portion at the second end of the fastener along the first axis. In some implementations, the threaded portion may be cylindrically shaped. The threads may be located on the outside of the cylinder. In some implementations, the threaded portion may include a second tool engagement portion at the second end of the fastener. The second tool engagement portion may be configured to receive a removal tool.

Another aspect of the present disclosure relates to a method for fabricating a frangible fastener such that the first end of the fastener separates from the second end of the fastener responsive to a breaking force. The method may comprise forming a head portion at the first end of the fastener; forming a frangible portion adjacent to the head portion toward the second end along a first axis; forming a tool engagement portion such that the tool engagement portion is configured to engage a tightening tool; forming a threaded portion adjacent to the tool engagement portion at the second end of the fastener along the first axis, and/or forming other components of the frangible fastener.

In some implementations, the frangible portion may be formed with a frangible body. The frangible body may be formed with a plurality of through wall cuts in a wall thickness of the frangible body. The frangible body may be formed such that the frangible body separates at or near the through wall cuts responsive to the breaking force. The frangible body may be formed such that the frangible body has a generally tubular form and the through wall cuts are radial through wall cuts in the wall thickness of the tube on a plane substantially perpendicular to the first axis.

In some implementations, the frangible portion may be formed such that the breaking force is proportional to a magnitude of the through wall cuts. The magnitude of the through wall cuts may comprise one or more of a quantity of the through wall cuts, a cross sectional area of the through wall cuts, a shape of the through wall cuts, and/or other properties of the through wall cuts. In some implementations, the frangible portion may be formed such that the breaking force is proportional to the wall thickness of the frangible body.

In some implementations, the tool engagement portion may be formed adjacent to the frangible portion toward the second end along the first axis.

In some implementations, the threaded portion may be formed adjacent to the tool engagement portion at the second end of the fastener along the first axis.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1A-1D illustrate a frangible fastener configured such that a first end of the fastener separates from a second end of the fastener responsive to a breaking force;
FIG. 1A is a perspective view of the fastener;
FIG. 1B is a section view of the fastener;
FIG. 1C is a side view of the fastener;
FIG. 1D is an end view of the first end of the fastener;
FIG. 2A illustrates an exemplary implementation of a frangible body;
FIG. 3 illustrates a method for fabricating a frangible fastener such that a first end of the fastener separates from a second end of the fastener responsive to a breaking force.

DETAILED DESCRIPTION

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the embodiments of the disclosure described herein, and any equivalents. Furthermore, reference to various aspects of the disclosure throughout this document does not mean that all claimed embodiments or methods must include the referenced aspects.

Figure 1A:
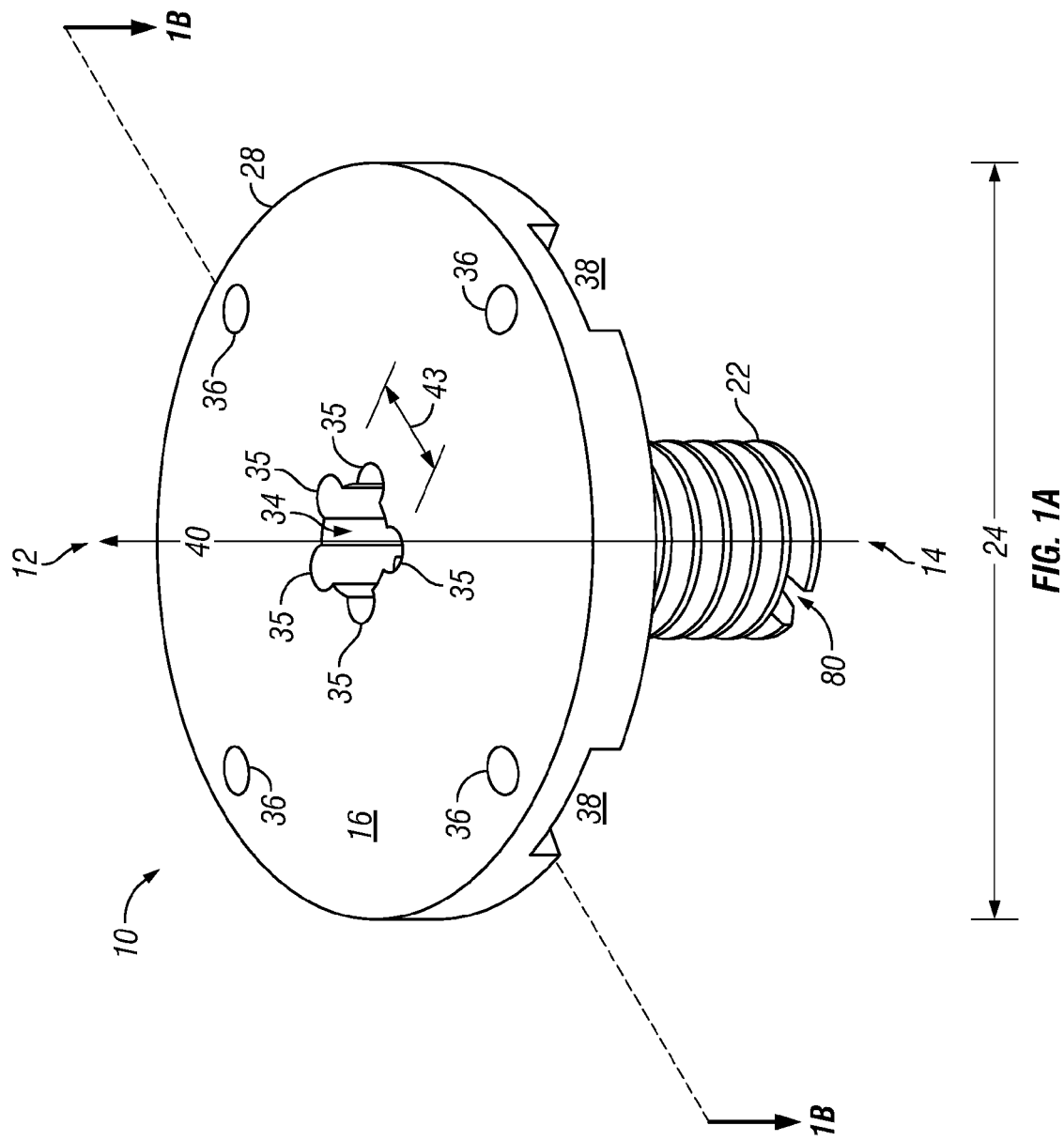
Figure 1C:
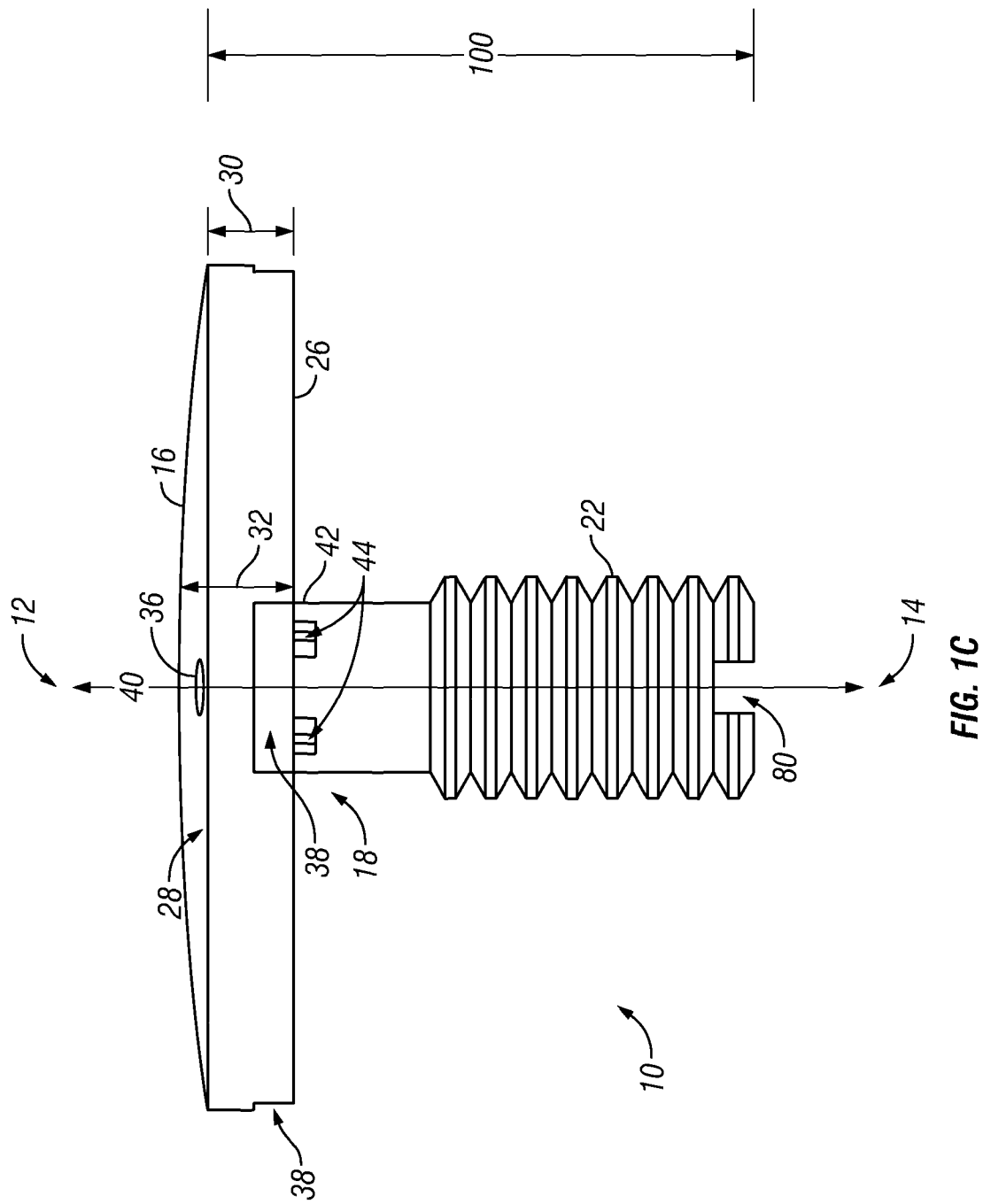
Figure 1D:
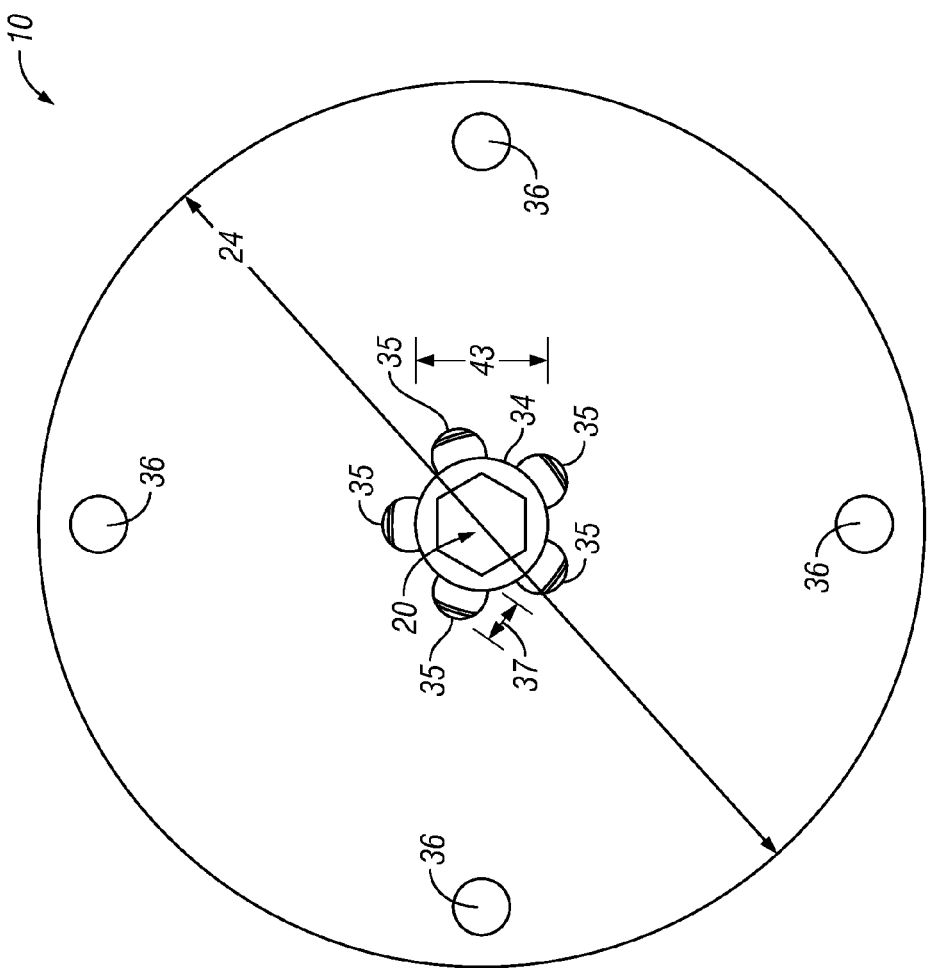

FIG. 1A-1D illustrate a frangible fastener 10 configured such that a first end 12 of fastener 10 separates from a second end 14 of fastener 10 responsive to a breaking force. FIG. 1A is a perspective view of fastener 10. FIG. 1B is a section view of fastener 10 (Section 1B-1B shown in FIG. 1A). FIG. 1C is a side view of fastener 10. FIG. 1D is an end view of first end 12 of fastener 10. Fastener 10 may be configured to couple one or more external components that operate structurally and/or frangibly. In some implementations, a head portion 16 of fastener 10 may be configured to engage a first external component and a threaded portion 22 of fastener 10 may be configured to engage a second external component. By way of a non-limiting example, fastener 10 may secure the exterior cover of an inflatable life raft in a fixed position on an aircraft. In the event the life raft must be deployed, fastener 10 may separate responsive to the breaking force of the inflating raft within the cover. In some implementations, fastener 10 may be used as an alternative to break away wire and/or in other applications. In some implementations, the size, scale, and/or material of fastener 10 may vary depending on the application. As such, the dimensions of the features described herein are not intended to be limiting. In some implementations, the dimensions may be increased and/or decreased from what is described herein such that frangible fastener 10 separates responsive to specifically targeted breaking forces. One of ordinary skill in the art will understand, for example, that the dimensions described herein may be increased (e.g., in an application requiring a larger version of fastener 10) and/or decreased (e.g., in an application requiring a smaller version of fastener 10) by factors of 2, 3, or more from what is described to achieve the targeted breaking forces. In some implementations, fastener 10 may comprise head portion 16, a frangible portion 18 (FIGS. 1B, 1C), a tool engagement portion 20 (FIG. 1B), threaded portion 22, and/or other portions.

As shown in FIG. 1A-FIG. 1D, head portion 16 may be located at first end 12 of fastener 10. Head portion 16 may have a generally circular shape with a diameter 24 (FIGS. 1A, 1D) of less than about 0.75 inches. Diameter 24 may be between about 0.50 inches and about 0.75 inches. Diameter 24 may be about 0.625 inches. Head portion 16 may comprise a planar side 26 (FIGS. 1B, 1C) toward second end 14 of fastener 10, an arcuate side 28 (FIG. 1A-1C) at first end 12 of fastener 10, and/or other components. Head portion 16 may have first thickness 30 (FIG. 1C) at and/or near the outside edge of head portion 16 and a second thickness 32 (FIG. 1C) at and/or near the center of head portion 16. The thickness of head portion 16 may steadily increase from first thickness 30 at and/or near the outside edge to second thickness 32 at and/or near the center. First thickness 30 may be less than about 0.075 inches. First thickness 30 may be between about 0.05 inches and about 0.075 inches. First thickness 30 may be about 0.064 inches. Second thickness 32 may be less than about 0.10 inches. Second thickness 32 may be between about 0.075 inches and about 0.10 inches. Second thickness 32 may be about 0.085 inches. The generally circular shape and approximate dimensions of head portion 16 shown in FIG. 1A-1D are not intended to be limiting. Head portion 16 may take any shape that allows it to function as described in the present disclosure.

Head portion 16 may form a channel 34 (FIGS. 1A, 1B, 1D) along a first axis 40 (FIG. 1A-1C). Channel 34 may be configured to receive a tightening tool (not shown). Channel 34 may be configured such that the tightening tool passes easily through channel 34. The tightening tool may include a screwdriver, a hex key, a wrench (e.g., an Allen wrench), and/or other tightening tools. In some implementations, channel 34 may be configured such that a ⅛ inch hex key, for example, passes easily through channel 34.

In some implementations, head portion 16 may form a plurality of arcuate radial cuts 35 (FIGS. 1A, 1B, 1D). Arcuate radial cuts 35 may be located on an edge of channel 34 and may open toward first axis 40. Arcuate radial cuts 35 may extend from first end 12 through head portion 16 substantially parallel to channel 34 and/or first axis 40. In some implementations, arcuate radial cuts 35 may have a depth 37 (FIG. 1D) between about 0.018 inches and about 0.031 inches.

In some implementations, head portion 16 may form a plurality of peripheral holes 36 (FIGS. 1A, 1B, 1D). Peripheral holes 36 may have radii less than about 0.03 inches. Peripheral holes 36 may have radii between about 0.01 inches and about 0.03 inches. Peripheral holes 36 may have radii of about 0.02 inches. In some implementations, head portion 16 may form depth cuts 38 (FIG. 1A) that correspond to peripheral holes 36. In the example shown in FIG. 1A-1D, there are four peripheral holes 36 and four corresponding depth cuts 38 (though only two depth cuts 38 are shown in FIG. 1A). Peripheral holes 36 and/or depth cuts 38 may be configured to receive safety wiring to secure head portion 16 to the first external component and/or other external components when fastener 10 is installed in a high vibration area, for example. The quantity and approximate dimensions of peripheral holes 36 and/or depth cuts 38 shown in FIG. 1A-1D are not intended to be limiting. Peripheral holes 36 and/or depth cuts 38 may have any dimension in any quantity that allows them to function as described in the present disclosure.

Frangible portion 18 (FIGS. 1B, 1C) may be located adjacent to head portion 16 toward second end 14 along first axis 40. Frangible portion 18 may comprise a frangible body 42 (FIGS. 1B, 1C) having a plurality of through wall cuts 44 (FIGS. 1B, 1C) in a wall thickness (not shown in FIG. 1A-1D) of frangible body 42. Frangible body 42 may be configured to separate at or near through wall cuts 44 responsive to the breaking force. In some implementations, frangible body 42 may have a generally tubular form. Through wall cuts 44 may be radial through wall cuts in the wall thickness of the tube on a plane substantially perpendicular to first axis 40. Frangible portion 18 may be configured to conduct the tightening tool from channel 34 in the head portion 16 to tool engagement portion 20 through a conduit 46 (FIG. 1B) formed by frangible body 42.

In some implementations, frangible portion 18 may be configured such that the breaking force is between about 5 pounds and about 400 pounds. In some implementations, frangible portion 18 may be configured such that the breaking force is between about 5 pounds and about 100 pounds. In some implementations, frangible portion 18 may be configured such that the breaking force is between about 5 pounds and about 25 pounds. In some implementations, frangible portion 18 may be configured to separate responsive to one or more of a tensile force, a shear force, and/or other forces. In some implementations, frangible portion 18 may be configured to separate responsive to a plurality of forces acting at substantially the same time. In some implementations, frangible portion 18 may be configured such that the breaking force meets technical standard order (TSO) performance standards for a given application (e.g., a 25 pound force limitation typically required for the activation of mechanical emergency systems).

In some implementations, frangible portion 18 may be configured such that the breaking force is proportional to a magnitude of through wall cuts 44. The magnitude of through wall cuts 44 may comprise one or more of a quantity of through wall cuts 44, a cross sectional area of through wall cuts 44, a shape (e.g., rounded corners and/or sharp corners) of through wall cuts 44, and/or other properties of through wall cuts 44. In some implementations, radial cuts 35 in head portion 16 may extent through frangible portion 18. The number of radial cuts 35 may correspond to the number of through wall cuts 44 in frangible body 42. Through wall cuts 44 may be aligned with corresponding radial cuts 35. Adjusting one or more dimensions (e.g., depth 37) and/or the shape (e.g., arcuate) of radial cuts 35 may change the cross sectional area, the shape, and/or other properties of through wall cuts 44.

In some implementations, frangible portion 18 may be configured such that the breaking force is proportional to the wall thickness of frangible body 42. The wall thickness of frangible body 42 may be adjusted by increasing and/or decreasing a diameter 43 (FIGS. 1A, 1D) of channel 34, for example. Increasing diameter 43 may decrease the wall thickness of frangible body 42 and decreasing diameter 43 may increase the wall thickness of frangible body 42, for example.

In some implementations, frangible portion 18 may be configured such that the breaking force is proportional to the inherent material properties of frangible portion 18. The inherent material properties may include one or more of tensile strength, shear strength, and/or other properties of the material used to form frangible fastener 10.

Figure 2B:
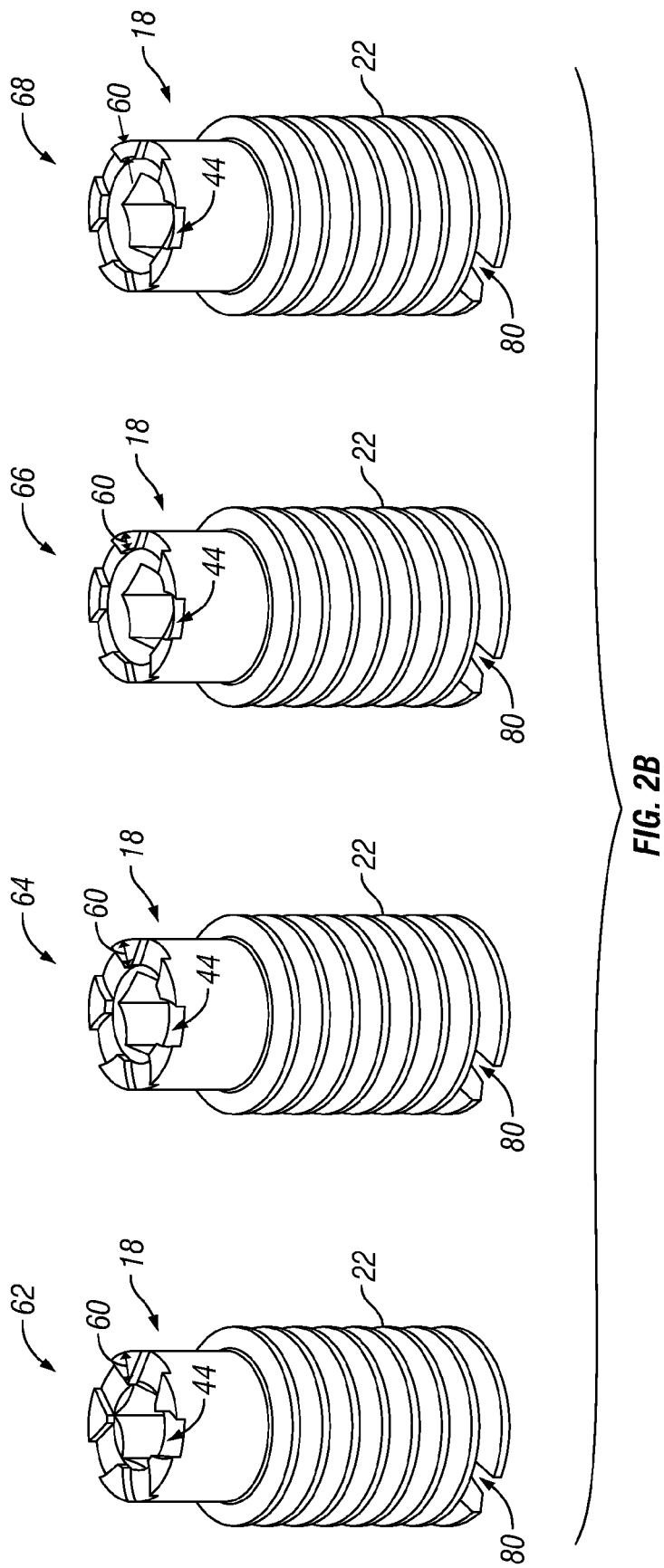
FIG. 2B illustrates a second implementation of a frangible body.

By way of a non-limiting example, FIG. 2A and FIG. 2B illustrate two implementations of frangible body 42. In the first implementation, FIG. 2A, frangible body 42 forms three through wall cuts 44 in a wall thickness 60 of frangible body 42. In the second implementation, FIG. 2B, frangible body 42 forms five through wall cuts 44 in wall thickness 60 of frangible body 42. A progressively thinner wall thickness 60 is shown in the images that correspond to reference numerals 62, 64, 66, and 68. Increasing the number or size of through wall cuts 44 will decrease the breaking force required to separate frangible fastener 10. Decreasing wall thickness 60 will decrease the breaking force required to separate frangible fastener 10. Accordingly, by adjusting the number and/or size of the through wall cuts 44 and/or the wall thickness 60 the breaking force of the fastener can be adjusted.

Returning to FIG. 1A-1D, tool engagement portion 20 (FIG. 1B) may be configured to engage the tightening tool. Tool engagement portion 20 may be located adjacent to frangible portion 18 toward second end 14 along first axis 40. The location of tool engagement portion 20 may minimize and/or eliminate torsional loading of frangible portion 18 during tightening with the tightening tool. In some implementations, tool engagement portion 20 may be configured such that an axial load (e.g., tension) may be transferred to and/or through frangible portion 18 responsive to head portion 16 engaging an external component (e.g., the first external component described above) as fastener 10 is tightened.

Threaded portion 22 (FIG. 1A-1C) may be located adjacent to tool engagement portion 20 at second end 14 of fastener 10 along first axis 40. In some implementations, threaded portion 22 may be cylindrically shaped. Threaded portion 22 may be configured such that the threads are included on the outside of the cylinder. Threaded portion 22 may be configured to engage a threaded hole in an external component (e.g., the second external component mentioned above).

In some implementations, threaded portion 22 may include a second tool engagement portion 80 (FIGS. 1A, 1C) at second end 14 of fastener 10. Second tool engagement portion 80 may be configured to receive a removal tool (not shown). In some implementations, tool engagement portion 20 may be configured to receive the removal tool. In some implementations, the removal tool may be the same as the tightening tool. In some implementations, the removal tool and the tightening tool may be different.

Responsive to a separation of first end 12 from second end 14, threaded portion 22 and/or other portions of frangible faster 10 may remain in the threaded hole of the external component. Threaded portion 22 and/or other portions of frangible fastener 10 may be removed via tool engagement portion 20 toward first side 12 and/or via tool engagement portion 80 toward second side 14.

In some implementations, an overall length 100 (FIG. 1C) of frangible fastener 10 including head portion 16, a frangible portion 18, a tool engagement portion 20, threaded portion 22, and/or other portions may be less than about 0.5 inches. In some implementations, length 100 may be between about 0.3 inches and about 0.5 inches. In some implementations, length 100 may be about 0.425 inches.

FIG. 3 illustrates a method 300 for fabricating a frangible fastener such that a first end of the fastener separates from a second end of the fastener responsive to a breaking force. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented via one or more processing devices (e.g., a digital processor, an analog processor, a digital circuit designed to process information, an analog circuit designed to process information, a state machine, and/or other mechanisms for electronically processing information) configured to control machining equipment. The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. In some implementations, method 300 may be implemented via machining methods, and/or other manufacturing methods.

In some implementations, the frangible fastener (e.g., frangible fastener 10 shown in FIG. 1) may be machined from a single rod shaped piece of stock material. Machining may include cutting, turning, milling, drilling, broaching, and/or other machining operations. In some implementations, the general shape of the frangible fastener may be formed by turning the rod shaped piece of stock material on a lathe, for example. The frangibility features (e.g., through wall cuts 44 shown in FIG. 1, FIG. 2A, and FIG. 2B) may be formed by making a series of drills, for example, into the frangible fastener. The tool engagement slots (e.g., tool engagement portions 20 and/or 80 shown in FIG. 1) may be formed by broaching the rod shaped piece of stock material. In some implementations, fastener 10 may be manufactured via plastic laser sintering, selective laser sintering (SLS), three dimensional printing, and/or other manufacturing methods. In some implementations, no joining is required to manufacture the frangible fastener.

At an operation 302, a head portion may be formed at the first end of the fastener. In some implementations, the head portion may be formed such that the head portion is configured to engage a first external component.

At an operation 304, a frangible portion may be formed adjacent to the head portion toward the second end along a first axis. The frangible portion may comprise a frangible body.

At an operation 306, a plurality of through wall cuts may be formed in a wall thickness of the frangible body. The frangible body may be configured to separate at or near the through wall cuts responsive to the breaking force. In some implementations, the frangible body may be formed such that the frangible body has a generally tubular form and the through wall cuts are radial through wall cuts in the wall thickness of the tube on a plane substantially perpendicular to the first axis. In some implementations, the frangible portion may be formed such that the breaking force is proportional to a magnitude of the through wall cuts. The magnitude of the through wall cuts may comprise one or more of a quantity of the through wall cuts, a cross sectional area of the through wall cuts, a shape of the through wall cuts, and/or other properties of the through wall cuts. In some implementations, the frangible portion may be formed such that the breaking force is proportional to the wall thickness of the frangible body.

At an operation 308, a tool engagement portion may be formed such that the tool engagement portion may engage a tightening tool. The tool engagement portion may be formed adjacent to the frangible portion toward the second end along the first axis. The location of the tool engagement portion may minimize and/or eliminate torsional loading of the frangible portion during tightening with the tightening tool.

At an operation 310, a threaded portion may be formed adjacent to the tool engagement portion at the second end of the fastener along the first axis. In some implementations, the threaded portion may be formed such that the threaded portion is configured to engage a second external component.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A frangible fastener configured to secure a first external component to a second external component until receiving a breaking force such that a first end of the fastener separates from a second end of the fastener and the first external component separates from the second external component responsive to the fastener receiving the breaking force, the fastener comprising:

a head portion located at the first end of the fastener, the head portion comprising a first side at the first end of the fastener and a second side located toward the second end of the fastener, the second side of the head portion configured to abut the first external component;

a frangible portion located adjacent to the head portion toward the second end along a first axis, the frangible portion comprising a frangible body having a plurality of through wall cuts in a wall thickness of the frangible body, the frangible body configured to separate at or near the through wall cuts responsive to the breaking force;

a tool engagement portion configured to engage a tightening tool, the tool engagement portion located adjacent to the frangible portion toward the second end along the first axis; and a threaded portion located adjacent to the tool engagement portion at the second end of the fastener along the first axis configured to engage corresponding threads formed in the second external component and cause the second side of the head portion to compress the first external component against the second external component until the frangible portion separates responsive to the breaking force.

2. The system of claim 1, wherein the head portion forms a channel configured to receive the tightening tool.

3. The system of claim 2, wherein the frangible portion is configured to conduct the tightening tool from the channel in the head portion to the tool engagement portion through a conduit formed by the frangible body.

4. The system of claim 1, wherein the head portion forms a plurality of peripheral holes configured to receive safety wiring.

5. The system of claim 1, wherein the threaded portion includes a second tool engagement portion at the second end of the fastener, the second tool engagement portion configured to receive a removal tool.

6. The system of claim 1, wherein the frangible body has a generally tubular form, and wherein the through wall cuts are radial through wall cuts in the wall thickness of the tube on a plane substantially perpendicular to the first axis.

7. The system of claim 1, wherein the frangible portion is configured such that the breaking force is between about 5 pounds and about 400 pounds.

8. The system of claim 1, wherein the frangible portion is configured to separate responsive to one or more of a tensile force, or a shear force.

9. The system of claim 1, wherein the frangible portion is configured such that the breaking force is proportional to a magnitude of the through wall cuts,
wherein the magnitude of the through wall cuts comprises one or more of a quantity of the through wall cuts, a cross sectional area of the through wall cuts, or a shape of the through wall cuts.

10. The system of claim 1, wherein the frangible portion is configured such that the breaking force is proportional to the wall thickness of the frangible body.

11. The system of claim 1, wherein the frangible portion is configured such that the breaking force is proportional to inherent material properties of the frangible portion.

12. The system of claim 11, wherein inherent material properties include one or more of tensile strength or shear strength of the material used to form the frangible fastener.

13. The system of claim 1, wherein the frangible body forms three through wall cuts in the wall thickness of the frangible body.

14. The system of claim 1, wherein the frangible body forms five through wall cuts in the wall thickness of the frangible body.

15. A method for fabricating a frangible fastener configured to secure a first external component to a second external component until receiving a breaking force such that a first end of the fastener separates from a second end of the fastener and the first external component separates from the second external component responsive to the fastener receiving the breaking force, the method comprising:
forming a head portion at the first end of the fastener, the head portion comprising a first side at the first end of the fastener and a second side located toward the second end of the fastener, the second side of the head portion configured to abut the first external component;
forming a frangible portion adjacent to the head portion toward the second end along a first axis, the frangible portion comprising a frangible body;
forming a plurality of through wall cuts in a wall thickness of the frangible body, the frangible body configured to separate at or near the through wall cuts responsive to the breaking force;
forming a tool engagement portion such that the tool engagement portion is configured to engage a tightening tool, the tool engagement portion formed adjacent to the frangible portion toward the second end along the first axis; and
forming a threaded portion adjacent to the tool engagement portion at the second end of the fastener along the first axis configured to engage corresponding threads formed in the second external component and cause the second side of the head portion to compress the first external component against the second external component until the frangible portion separates responsive to the breaking force.

16. The method of claim 15, further comprising forming the frangible body such that the frangible body has a generally tubular form and the through wall cuts are radial through wall cuts in the wall thickness of the tube on a plane substantially perpendicular to the first axis.

17. The method of claim 15, further comprising forming the frangible portion such that the breaking force is proportional to a magnitude of the through wall cuts,
wherein the magnitude of the through wall cuts comprises one or more of a quantity of the through wall cuts, a cross sectional area of the through wall cuts, or a shape of the through wall cuts.

18. The method of claim 15, further comprising forming the frangible portion such that the breaking force is proportional to the wall thickness of the frangible body.

19. A frangible fastener configured such that a first end of the fastener separates from a second end of the fastener responsive to a breaking force, the fastener comprising:
a head portion located at the first end of the fastener, the head portion forming a channel along a first axis of the frangible fastener extending toward the second end of the fastener;
a frangible portion located adjacent to the head portion toward the second end along the first axis, the frangible portion comprising a frangible body having a plurality of through wall cuts in a wall thickness of the frangible body, the through wall cuts formed by radial bores that extend from the head portion at the first end to the frangible portion, the radial bores being substantially parallel to the first axis and located at an edge of the channel such that the radial bores form the through wall cuts in the wall thickness of the frangible body, the frangible body being configured to separate at or near the through wall cuts responsive to the breaking force;
a tool engagement portion configured to engage a tightening tool, the tool engagement portion located adjacent to the frangible portion toward the second end along the first axis; and
a threaded portion located adjacent to the tool engagement portion at the second end of the fastener along the first axis.

20. The fastener of claim 19 wherein the tool engagement portion defines an internal recess adjacent to the channel toward the second end of the fastener configured to receive and engage the tightening tool.

* * * * *